(12) United States Patent
Paronyan

(10) Patent No.: US 11,718,529 B1
(45) Date of Patent: Aug. 8, 2023

(54) GRAPHENE NETWORKS AND METHODS FOR SYNTHESIS AND USE OF THE SAME

(71) Applicant: Tereza M. Paronyan, Louisville, KY (US)

(72) Inventor: Tereza M. Paronyan, Louisville, KY (US)

(*) Notice: Subject to any disclaimer, the term of this patent is extended or adjusted under 35 U.S.C. 154(b) by 39 days.

(21) Appl. No.: 16/193,477

(22) Filed: Nov. 16, 2018

Related U.S. Application Data

(63) Continuation-in-part of application No. 15/359,682, filed on Nov. 23, 2016, now abandoned, which is a continuation-in-part of application No. 15/359,393, filed on Nov. 22, 2016, now abandoned.

(60) Provisional application No. 62/258,779, filed on Nov. 23, 2015.

(51) Int. Cl.
*C01B 32/194* (2017.01)
*B01J 21/18* (2006.01)
*B01J 23/755* (2006.01)
*B01J 35/00* (2006.01)

(52) U.S. Cl.
CPC .............. *C01B 32/194* (2017.08); *B01J 21/18* (2013.01); *B01J 23/755* (2013.01); *B01J 35/0033* (2013.01); *C01B 2204/04* (2013.01); *C01B 2204/22* (2013.01); *C01P 2002/50* (2013.01)

(58) Field of Classification Search
CPC ........ C01B 32/194; B01J 21/18; B01J 23/755; B01J 35/0033; C01B 2204/04; C01B 2204/22; C01P 2002/50

USPC ...................................................... 429/231.8
See application file for complete search history.

(56) References Cited

U.S. PATENT DOCUMENTS

| | | | |
|---|---|---|---|
| 8,663,593 B2 | 3/2014 | Yoo et al. | |
| 8,871,302 B2 | 10/2014 | Teng et al. | |
| 9,000,591 B2 | 4/2015 | Yamazaki et al. | |
| 9,845,551 B2 | 12/2017 | Tour et al. | |

(Continued)

OTHER PUBLICATIONS

Chen, Bulk growth of mono- to few-layer graphene on nickel particles by chemical vapor deposition from methane, Carbon 2010, 48, 3543 - 3550.

Choi, Correlation between micrometer-scale ripple alignment and atomic-scale crystallographic orientation of monolayer graphene, Scientific Reports 2014, 4:7263, all pages.

Ferrari, Raman Spectrum of Graphene and Graphene Layers, Physical Review Letters 2006, 97, 187401, all pages.

(Continued)

*Primary Examiner* — Gary D Harris
(74) *Attorney, Agent, or Firm* — Law Office of J.L. Simunic; Joan Simunic

(57) ABSTRACT

The present development is a novel graphene foam with highly enriched incommensurately-stacked layers. The graphene foam is intended to be applied as active electrodes in rechargeable batteries. A 93% incommensurate graphene foam demonstrated a reversible specific capacity of 1540 mAh $g^{-1}$ with a 75% coulombic efficiency, and an 86% incommensurate sample achieves above 99% coulombic efficiency exhibiting 930 mAh $g^{-1}$ specific capacity.

14 Claims, 16 Drawing Sheets

(56) References Cited

U.S. PATENT DOCUMENTS

| | | | |
|---|---|---|---|
| 9,978,402 | B2 | 5/2018 | Zheng et al. |
| 10,167,572 | B2* | 1/2019 | Veerasamy ............. C30B 25/02 |
| 2012/0128573 | A1 | 5/2012 | Yoo et al. |
| 2013/0202945 | A1 | 8/2013 | Zhamu et al. |
| 2013/0217222 | A1* | 8/2013 | Johnson et al. ......... B82Y 30/00 |
| | | | 438/610 |
| 2013/0243969 | A1 | 9/2013 | Teng et al. |
| 2013/0249093 | A1 | 9/2013 | Yamazaki et al. |
| 2014/0363363 | A1 | 12/2014 | Naritsuka et al. |
| 2016/0176714 | A1* | 6/2016 | Do et al. ................. B01J 8/02 |
| | | | 423/448 |
| 2016/0376156 | A1 | 12/2016 | Choubak et al. |
| 2017/0057826 | A1* | 3/2017 | Strudwick et al. ... C01B 32/186 |
| 2017/0216923 | A1* | 8/2017 | Babenko et al. ......... H01B 1/06 |

OTHER PUBLICATIONS

Hu, Spontaneous Reduction and Assembly of Graphene oxide into Three-Dimensional Graphene Network on Arbitrary Conductive Substrates, Scientific Reports 2013, 3:2065, all pages.

Marchena, Direct growth of 2D and 3D graphene nano-structures over large glass substrates by tuning a sacrificial Cu-template layer, 2D Mater. 2017, 4, 025088, all pages.

Ni, Raman Spectroscopy and Imaging of Graphene, Nano Res 2008, 1, 273 - 291.

Paronyan, Incommensurate Graphene Foam as a High Capacity Lithium Intercalation Anode, Scientific Reports 2017, 7:39944, all pages.

Ping, Preparation of three-dimensional graphene foam for high performance supercapacitors, Prog. in Nat. Sci.: Mat'l Int. 2017, 27, 177 - 181.

Woods, Commensurate-incommensurate transition in graphene on hexagonal boron nitride, Nature Physics, 2014, 10:1038, all pages.

Yao, Quasicrystalline 30 twisted bilayer graphene as an incommensurate superlattice with strong interlayer coupling, PNAS 2018, 115, 6928 - 6933.

Zhou, Low-temperature NI particle-templated chemical vapor deposition growth of curved graphene for supercapacitor applications, Nano Energy 2015, 13, 458 - 466.

Bak, Commensurate phases, incommensurate phases and the devil's staircase, Rep. Prog. Phys., 1982, v. 45, all pages.

* cited by examiner

GRAPHENE NETWORKS AND METHODS FOR SYNTHESIS AND USE OF THE SAME

CROSS-REFERENCE TO PRIOR APPLICATIONS

The present application claims priority to U.S. Pat, Application 62/258,779 filed Nov. 23, 2015, now expired, and to U.S. Pat, Application 15/359,682 filed Nov. 23, 2016, currently pending, both of which are incorporated by reference in their its entireties.

FIELD OF THE INVENTION

The presently-disclosed subject matter relates to a three-dimensional graphene network, methods for synthesizing a three-dimensional graphene network, and methods for using the three-dimensional graphene network. In particular, the presently-disclosed subject matter relates to methods for synthesizing graphene networks whereby a hydrocarbon source is applied to a three-dimensional metal catalyst to obtain a three-dimensional graphene network with incommensurate stacking and that is useful in the assembly of lithium batteries.

BACKGROUND OF THE INVENTION

The idea of a rechargeable lithium cell based on lithium ion ($Li^+$) insertion reactions has been studied since the early 1970s, and numerous lithium insertion electrodes have been proposed to date. The small $Li^+$ can penetrate easily into solids by insertion reactions and can be inserted reversibly within most carbonaceous materials.

A commonly selected active material for use in rechargeable lithium batteries (LiBs) is graphite, chosen by its high-energy density, high power density and high coulomb efficiency, but rather low capacitance (372 mAh $g^{-1}$). The limited capacity of graphite-based LiBs is caused by the low capability of storing lithium ions within commensurate stacked graphene layers. The intercalation reaction occurs only at prismatic surfaces (arm-chair and zig-zag faces). Through the basal planes, intercalation is possible at defect sites only, and no significant lithium intercalates between graphene layers in graphite. The commensurate stacking order is the main reason for limited intercalation of lithium in basal planes. Indeed, the quality of carbon sites capable of hosting the lithium strongly depends on crystallinity, microstructure and micromorphology of the carbonaceous material. The microstructure of carbon material, such as stacking order, interlayer distance, porosity, defects and thicknesses determines binding between Li and $sp^2$ carbon.

In rechargeable electrochemical cells, reactions at both negative and positive electrodes have to be highly reversible to maintain the specific charge for hundreds of charge/discharge cycles. For this purpose, graphene is actively being pursued as an active and inactive material for next generation electrochemical energy storages. Graphene is $sp^2$-hybridized carbon packed into a 2D honeycomb lattice. Graphene has a high surface area, a superior electrical conductivity, a high mechanical flexibility, a chemical stability, a light weight, and a low cost. It has been suggested that single layer graphene (SLG) possesses a capacity of 744 mAh $g^{-1}$ on the basis of double-site insertion of lithium corresponding $Li_2C_6$ stoichiometry. Chemically-derived defected graphene and other $sp^2$ carbon derivatives have shown much higher specific capacity, but are unstable at a high rate of current density and long term of cycling.

Various models of Li—C binding have been considered to explain the unpredicted high capacity in LiBs when carbonaceous material has been applied as a hosting material. A $Li_2$ covalent model arrangement has been proposed, where Li atoms intercalate and occupy nearest neighbor sites between each pair of carbon sheets resulting in a $LiC_2$ with a capacity of 1116 mAh $g^{-1}$ capacity. The defective porous graphene network demonstrated a tendency to increase capacity during cycling, achieving up to 900 mAh $g^{-1}$ which remains stable over hundreds of cycles. Recently, theoretical calculations have predicted much higher capacity of LiBs with a graphene network when the graphene network is occupied by a large number of defects, such as pentagons, heptagons, octagons, and the like. Also, it has been demonstrated that low theoretical capacitance of graphene-based materials can be significantly improved by altering local structure and morphological features, principally, in the multilayer configuration. Multilayer graphene is particularly interesting because its electronic properties can be manipulated through variation of layers and their orientation. The absence of a commensurately-stacking order within adjacent graphene layers results in weaker Van der Waals forces, and an increase in rotation angle between layers decreases the interplanar interaction so that the incommensurate multilayers can be considered as a single layer with modified electronic structure. In fact, the incommensurately-stacked infinite layer graphene can be considered as a "graphite-like" structure with weakened interplanar interaction exhibiting novel physical and electronic properties.

Despite the efforts to improve carbonaceous material performance capacity for LiBs over many charge/discharge cycles, the challenge remains for battery scientists and engineers. Graphene quality and $sp^2/sp^3$ carbon architecture becomes a crucial issue in the limits of the rate capability of the charge/discharge reaction and may complete the understanding of Li insertion mechanism. Further, while numerous methods for growing commensurately-stacked multilayer graphene (CMLG) networks are known in the art, methods for preparing consistent incommensurately stacked graphene sheets remains elusive.

The incommensurate stacking order between graphene layers results in a very weak interplanar interaction so the multilayer incommensurate graphene can possess the properties of single layer graphene in a multilayer stack. In this case, testing of high crystalline incommensurate graphene as an active material of lithium intercalation could be challenging. Large area 2D crystalline graphene with controlled bi- or few stacking layers have been developed on various substrates and even in solution. In this regard, nickel metal with different shapes and sizes has been found desirable for developing 3D multilayered stacking crystalline graphene networks for various applications. To date, however, testing of various types of multilayered commensurate stacking graphene as an anode material for Li-ion batteries has proven to be unsuccessful for high capacity cells. Moreover, a technique that allows for the production of a high crystalline multilayer graphene network in a preferred occupancy of incommensurately-stacked layering for use as an active material for LiBs has not been established.

SUMMARY OF THE PRESENT INVENTION

The present development is method for the preparation of a high crystalline, curved, thin graphene 3D network or foam that has highly enriched (up to 93%) incommensurate multilayers of graphene. The method involves forming a catalyst template from metal particles, then applying a hydrocarbon source to the template to form a graphene-metal template, and then removing the metal from the graphene metal template to obtain a graphene network, and then drying the graphene network. In a preferred embodiment, the metal particles are non-uniform nickel particles with a particle size of from about 1 µm to about 40 µm. The method produces well-interconnected curved graphene sheets as a foam. The foam produced by this method exhibits a highly reversible capacity as an active working material in lithium battery (LiB) cells.

DETAILED DESCRIPTION OF THE PRESENT DEVELOPMENT

Figure 1:
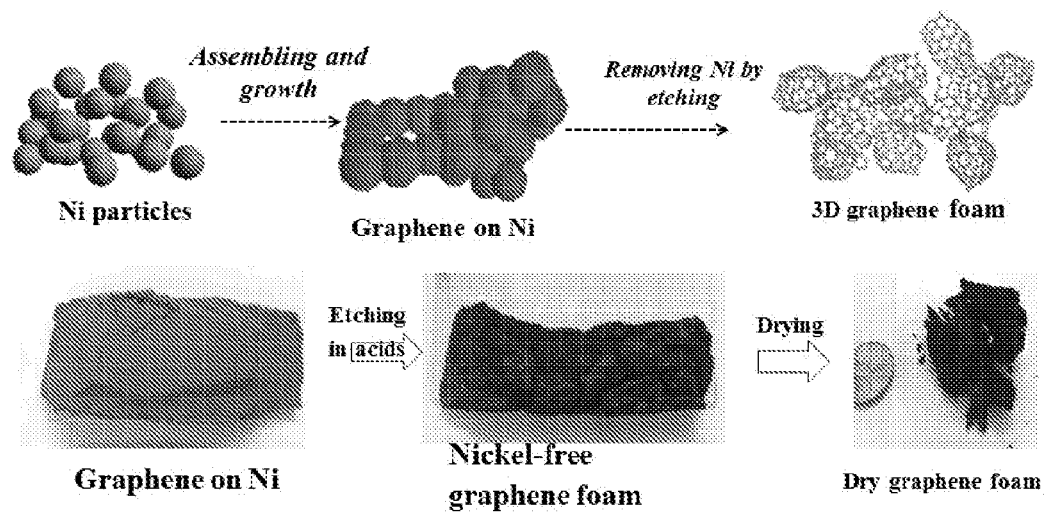
FIG. 1 is a schematic illustration of the preparation of graphene foam.

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

As used herein, the term "commensurate stacking" means that the carbon atoms in each layer follow an AB or ABA stacking pattern and the atoms on adjacent or neighboring layers are either completely (ABA) or half (AB) coincident. As used herein, the term "incommensurate stacking" means that adjacent layers of atoms are rotated relative to each other, causing the lattice orientations to mismatch, and the graphene sheets are interconnected without any certain stacking or as misoriented graphene layers.

The present development is a three-dimensional (3D) graphene network, methods for synthesizing a 3D graphene network, and methods for using the 3D graphene network. In particular, the presently-disclosed subject matter relates to methods for synthesizing graphene networks whereby a hydrocarbon source is applied to a 3D metal catalyst to obtain a 3D graphene network with incommensurate stacking that is useful in the assembly of lithium batteries. In some embodiments, the presently-disclosed subject matter includes methods of producing a graphene foam, which is a form of carbon comprised of a 3D network of incommensurate stacking of multiple layers of graphene.

The method of the present development involves forming a metal catalyst template from metal particles, then applying a hydrocarbon source to the template to form a graphene-metal template, and then removing the metal from the graphene metal template to obtain a graphene network, and then drying the graphene network. In an exemplary embodiment, non-uniform nickel particles with particle sizes of from about 1 micrometer (1 μm) to about 40 μm are used as the catalyst to initiate a curved template for decomposition of a hydrocarbon gas, such as methane, by a Chemical Vapor Deposition (CVD) method. The method produces well-interconnected curved graphene sheets as a foam. The foam produced by this method exhibits a highly reversible capacity as an active working material in lithium battery (LiB) cells.

As described in further detail below, the graphene sheets forming the graphene network of the present development synthesized by the presently-described methods are interconnected without any certain stacking, which is also known as incommensurate stacking or misoriented graphene layers. This incommensurate stacking affects the physical, mechanical, electrical and chemical properties of the graphene sheets, and creates new capabilities for graphene in various applications. In addition to allowing high density charge transfer because of the incommensurate stacking nature, the presently-disclosed graphene sheets also allow for easy intercalation of small size ions, such as lithium, into two graphene layers presumably due to weak interaction forces present in the incommensurate stacking of the graphene layers. This, in turn, allows the produced multilayer incommensurate graphene material to be used as an active working anode material in lithium ion battery (LiB) cells, in some cases having about 4 times higher reversible specific capacity after 100 cycles compared to existing graphite-based anodes of current commercial LiBs. Lithiated samples of exemplary graphene networks have been shown to form $Li_3C_4$, $Li_4C_6$ and $Li_{N+1}C_{2N}$ using high occupancy incommensurate bilayer, tri-layer and N-layer products corresponding to, in some embodiments, 1674 mAh $g^{-1}$, 1448 mAh $g^{-1}$ and 1116 mAh $g^{-1}$ specific capacity values, respectively. Ex-situ characterization of the graphene foam network-based electrodes indicates a new Li-ion insertion mechanism into this type of graphene structure, which then allows for the development of next generation high capacity high density rechargeable batteries.

The method for synthesizing the graphene sheets comprises forming a metal catalyst template from metal particles, then applying a hydrocarbon source to the template to form a graphene-metal template, and then removing the metal from the graphene metal template to obtain a graphene network, and then drying the graphene network.

To form the metal catalyst template, metal particles are assembled into the 3D template under suitable temperatures and pressure determined, at least in part, by the size and type of metal particles used. Representative temperatures range from about 800° C. to about 1200° C., and preferably from about 950° C. to about 1100° C., and more preferably from about 1000° C. to about 1050° C. Representative pressures range from about 40 mTorr to about 150 mTorr, and preferably from about 40 mTorr to about 60 mTorr, and more preferably from about 45 mTorr to about 55 mTorr.

It is recommended that the metal particles forming the metal catalyst template preferably have a non-uniform particle shape and a non-uniform size with a minimum particle size of about 1 micrometer. As used herein, "non-uniform" means that within any particular production batch, the metal particles will be a mixture of nickel particles having non-uniformly shaped particles, e.g. not all particles will be spherical, and having non-uniform particle sizes based on a predetermined size and including +/- up to 50% of the predetermined size within the mixture, e.g. a 1 micrometer metal particle mixture of will have metal particles ranging from about 0.5 micrometers to about 1.5 micrometers, whereas a 40 micrometer metal particle mixture of will have metal particles ranging from about 20 micrometers to about 60 micrometers and a 200 micrometer metal particle mixture of will have metal particles ranging from about 100 micrometers to about 300 micrometers. Without being bound by any theory, it is believed that the non-uniform particles aid in the formation of incommensurate stacking in the formation of the graphene.

Representative metal particles sizes for forming the metal catalyst template of the present process range from about 1 μm to up to about 200 microns. As is known in the art, 3D templates that include a suitable metal for graphene growth can be produced in many different shapes and forms. In an exemplary embodiment, the metal catalyst template is produced from non-uniform nickel particles with particle sizes of from about 1 μm to about 40 μm, and the nickel source may be commercially available nickel or nickel alloys or nickel powders of up to 100 microns in size or various uniform and/or non-uniform sizes of nickel particles and/or nickel alloys, such as stainless steel, nickel alloy 200 or nickel alloy 201, or nickel mesh of up to 100 microns porosity or curved shape nickel alloys or combinations thereof.

The formation of the metal catalyst template may occur in the presence of a carrier gas, such as but not limited to oxygen-free gas mixtures, argon, hydrogen, helium, nitrogen or combinations thereof. When a combination of carrier gases is used, the molar ratio of the carrier gas may be from about 1:1 to about 1:2 to about 1:3 to about 1:4 to about 1:5 to about 1:10 to about 2:3 to about 3:4 to about 10:1 to about 3:2. In an exemplary embodiment, the carrier gas is a combination of argon and hydrogen ($Ar_2:H_2$) having an argon to hydrogen ratio ($Ar/H_2$) of about 3:2. The flow rate of the carrier gas is adjusted according to the processing conditions and capacity of the heating device utilized. For example, a continuous flow of a carrier gas preferably has a flow rate of from about 10 sccm to about 1000 sccm depending on the particular carrier gas and the other processing conditions.

Figure 2A:
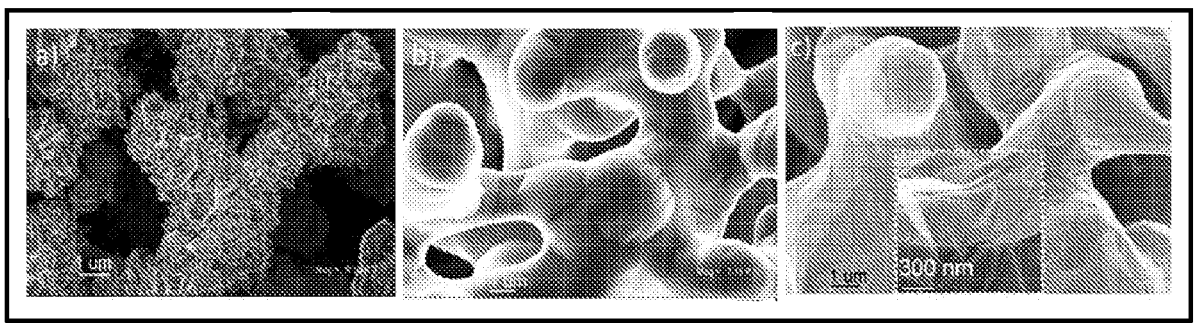
FIG. 2A is a collection of Scanning Electron Microscope (SEM) images of a) Ni particles as received, b) a Ni particle template after treatment at 1000-1050° C., and c) graphene deposition on Ni particle template at 1025-1050° C.
Figure 2B:
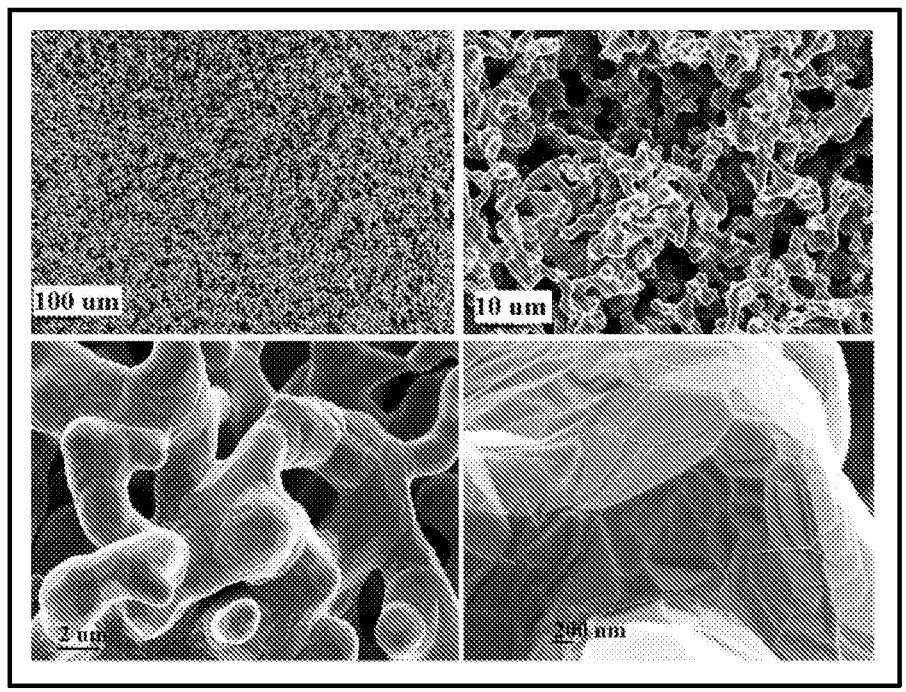
FIG. 2B is a collection of SEM images of graphene film on nickel particles with each image at a different magnification.

A hydrocarbon source is then applied to the metal catalyst template to form a graphene-metal template, as shown in FIG. 1. The hydrocarbon source may be applied by methods known in the art, such as but not limited to Chemical Vapor Deposition (CVD), and the graphene can be directly deposited onto any template suitable for preparation of a graphene network, as shown in FIGS. 2A and 2B. The term "hydrocarbon source" is used herein to refer to any class of carbons that include carbon and hydrogen in their structure and are useful in the production of graphene. Exemplary hydrocarbon sources are methane, acetylene, or ethylene. In a preferred embodiment, the hydrocarbon source is methane.

The conditions for the hydrocarbon source application, such as temperature and hydrocarbon flow rate, are dependent on the particular hydrocarbon source and the properties of the desired graphene network to be produced. To produce the graphene networks in the examples presented herein, the hydrocarbon source is applied at a temperature of from about 900° C. to about 1200° C., and preferably from about 950° C. to about 1100° C., and more preferably from about 1025° C. to about 1050° C., and a graphene flow rate of from about 1 sccm to about 100 sccm, and preferably at a rate of from about 1 sccm to about 50 sccm, and more preferably at a rate of from about 1 sccm to about 20 sccm, and most preferably at a rate of about 8 sccm, wherein the graphene flow rate will be dependent on the catalyst size and amount. The application of the hydrocarbon source is typically performed using the carrier gas, such as but not limited to oxygen-free gas mixtures, argon, hydrogen, helium, nitrogen or combinations thereof.

Figure 3A:
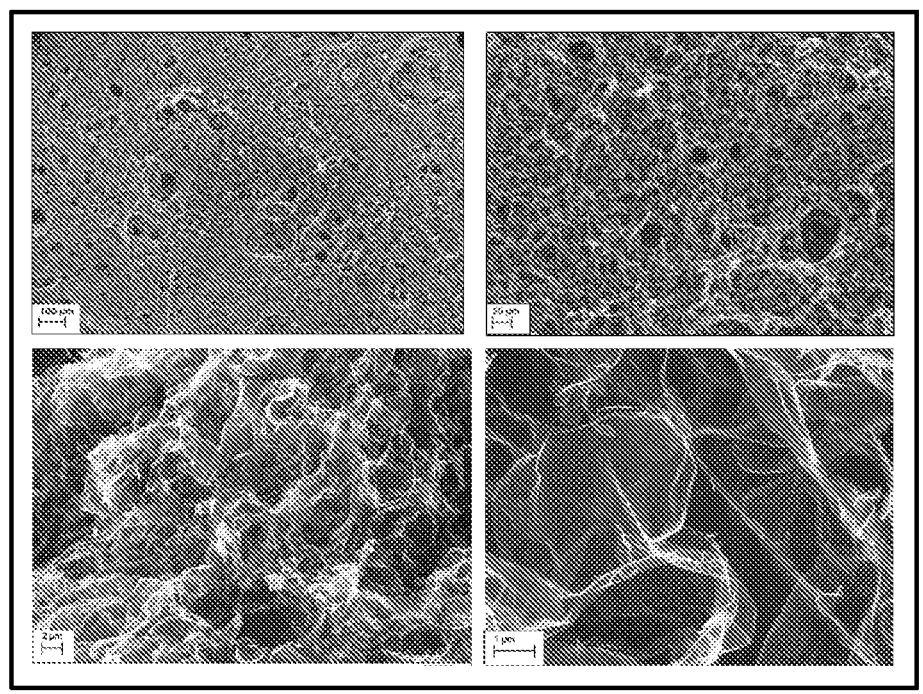
FIG. 3A is a collection of SEM images of graphene foam after it has been removed from the metal catalyst template with each image at a different magnification.

After the graphene-metal template is formed and before removing the metal template to recover the graphene network, the reaction chamber is allowed to cool to a predetermined temperature while holding the pressure at a range of from about 40 mTorr to about 150 mTorr, depending on the carrier gases flow rate. After cooling, the metal template is removed to leave the graphene network, as shown in FIG. 3A. The metal may be removed by treating the graphene metal template with ferric chloride, aqueous ferric chloride, hydrochloric acid, nitric acid or a combination thereof. It is anticipated that other acids may be used for removing the metal from the graphene metal template, provided the acid selected can remove the metal without causing the graphene network to decompose or distort. These reactions may occur at room temperature.

Figure 3B:
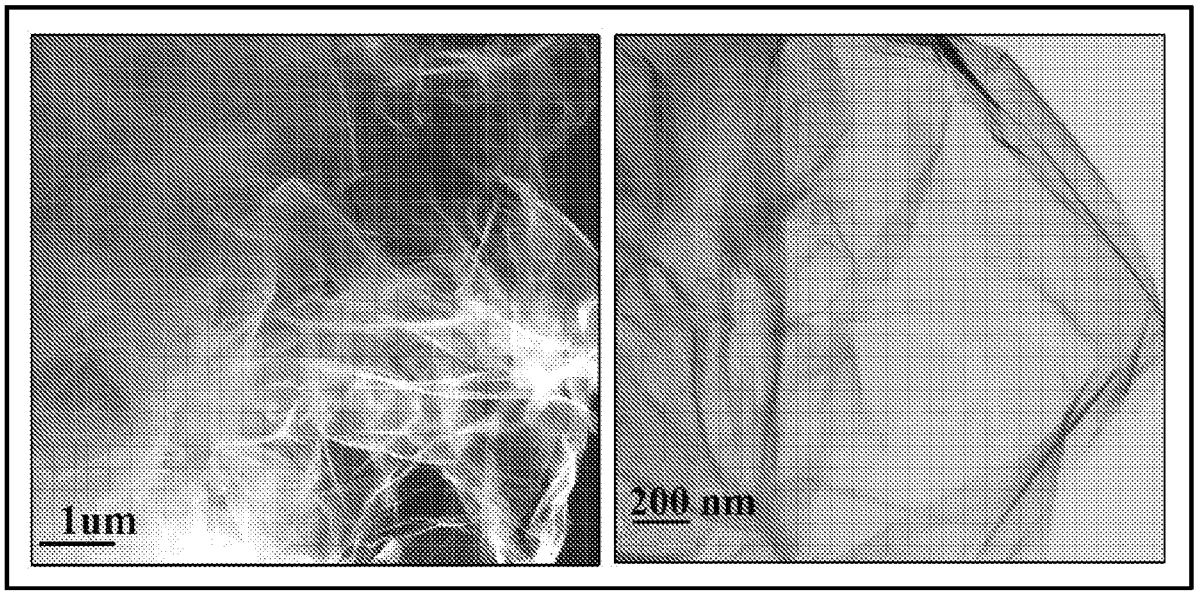
FIG. 3B is a Scanning Transmission Electron Microscope (STEM) image of the dried graphene sheets made according to the present inventive method.

The isolated graphene network is then dried. Optionally, prior to drying the graphene network may be washed, such as with DI water or ethyl alcohol. The drying process may be performed using a Critical Point dryer, such as the Samdri® PVT-3D produced by Tousimis or a Polaron Critical Point Drier. It has been observed that the drying of the graphene network advantageously avoids agglomeration in the graphene network. Exemplary graphene sheets forming the graphene network are shown in FIG. 3B.

By making use of the above-describe method for producing a graphene network, in some embodiments and as described above, the graphene network produced advantageously has incommensurate multilayer stacking, and in some embodiments has an incommensurate stacking occupancy of from about 19% up to 93 %. Further, in some embodiments, the graphene network produced according to the methods disclosed herein have a Brunauer-Emmet-Teller (BET) surface area of up about 100 m²/g and, in some embodiments, the graphene network has a pore size of greater than about 70 nm. In some embodiments, the produced graphene network has a crystallite size of from about 230 nm to about 600 nm and, in some instances, the crystallite size (sometimes named also as a grain size) in the graphene plane is between about 460 nm and 575 nm. In some instances, the graphene network produced by the presently disclosed methods has an $I_{2D}/I_G$ of from about 0.5 to about 5, and more preferably about 0.8 to about 2.4. In some embodiments the graphene network has a full width of half maximum (FWHM) of Raman 2D band about 33 $cm^{-1}$ to about 65 $cm^{-1}$ and more preferably about 37 $cm^{-1}$ to about 56 $cm^{-1}$. In some instances, the graphene network produced has an XRD peak of (002) at about 26.35° - 26.46°.

With further respect to the graphene layer(s) produced, as a result of the structure of the produced graphene layer(s), in some embodiments, the graphene network can further comprise lithium, such that the graphene network can be used, in some embodiments, as an active material in lithium batteries. As such, in some embodiments, the presently-disclosed subject matter further includes a lithium battery anode comprising a graphene network produced according to the methods described herein. Such a lithium battery anode comprising the graphene network of the presently-disclosed subject matter can have increased reversible specific capacities compared to graphene networks with commensurate stacking. For example, in some embodiments, a battery using the graphene network of the present subject matter with incommensurate stacking can have a reversible specific capacity of from about 410 mAh $g^{-1}$ to about 1540 mAh $g^{-1}$ after 100 cycles compared to existing graphite anode-based commercial LiBs which typically have a reversible specific capacity of about 300 mAh $g^{-1}$. The batteries using the graphene networks can also advantageously have a coulomb efficiency of greater than about 99% over 100 cycles.

By producing the graphene network using the above-described methods, the produced graphene networks also exhibit properties making them particularly suitable for a number of other applications. For example, the graphene network has application in high capacity energy storage applications, such as rechargeable batteries and super-capacitors. Use of the graphene structures in hydrogen storage, mass cleaning/filtration of water from heavy metals, chemical sensors, solar cell devices, high conductive electrical devices, and applications in the automotive, aircraft, space and medical industries are also contemplated to be within the scope of the subject matter described herein.

The presently-disclosed subject matter is further illustrated by the following specific but non-limiting examples:

In an exemplary preparation of a graphene network, presented for example only and not intended to be limiting in scope, 99.9% pure nickel powder with non-uniform particles and particle sizes of about 1 μm to about 40 μm are placed into a 1.5-inch diameter quartz tube. A 3:2 $Ar:H_2$ mixture carrier gas is allowed to flow through the quartz tube at a rate of about 80 sccm. The quartz tube is pressurized to a pressure of about 50 mTorr. While maintaining the tube at about 50 mTorr, the quartz tube is placed in an oven and heated to 600° C. at a 50° C./min heating rate, and then the tube is heated to 1000° C. at a 70° C./min heating rate and held at 1000° C. for 10 minutes, and then the tube is heated at a rate of 70° C./min until the tube reaches a temperature of from about 1025° C. to about 1050° C. and a nickel template is formed. After the nickel template is formed and while maintaining the quartz tube temperature between about 1025° C. to about 1050° C. and while continuing the carrier gas flow, methane is fed into the quartz tube at a rate of approximately 8 sccm for about 10 minutes to allow a graphene film or network to grow on the nickel template. After the graphene-nickel template is formed and while continuing the carrier gas flow, the quartz tube is allowed to cool to a final temperature of about 25° C. at a cooling rate of 100° C./min. The graphene-nickel template is then removed from the quartz tube and the graphene network is removed from the template by etching the template in a solution of 1M HCl and 1 M $HNO_3$. The freed graphene network is then washed with DI water several times, and then rinsed with pure ethylene alcohol several times, and then the graphene network is placed in a chamber and covered with ethylene alcohol and cooled to slightly below 20° C. High purity (min 99.8%) liquid $CO_2$ is applied through the graphene network at a pressure of 800 psi (±5%). When the graphene network is covered by liquid $CO_2$, the chamber is heated to about 40° C. while increasing the pressure to about 1200 psi. The chamber then immediately starts to cool down to about 25° C. and the pressure drops to about 400 psi. The chamber is then opened, the pressure released, and the dried graphene network is recovered.

As is known in the art, the microstructure and morphologies of the graphene network can be investigated using scanning electron microscopy (SEM), transmission electron microscopy (TEM), high-resolution transmission electron microscopy (HRTEM), selected area electron diffraction (SAED), and Raman Spectroscopy. Fast Fourier Transform (FFT) analysis of the HRTEM image shows the stacking morphology within graphene layers which results from the curved nature of the produced sheets as well as the incommensurate stacking of adjacent graphene layers. Elemental analysis performed using Energy Dispersive X-ray Spectroscopy (EDS) confirms a pure carbon content of 97at% to about 99at%. XRD evaluation shows crystallinity of the graphene network in-plane and interplanar incommensurate interaction of layers, and XPS confirms the enriched $sp^2$ carbon. Raman spectroscopy shows high crystallinity of graphene layers and incommensurateness of the layers due to rotation. Lithium ion battery half cells were assembled based on incommensurate multilayer graphene foam and Li foil as a counter electrode, and the graphene foam network performance evaluated, including discharge-and charge measurement and cyclic voltammetry. Without being bound by theory, it is believed that a new lithium insertion mechanism into incommensurate multilayer graphene structures was observed and Li-intercalated (also referred to as "Li-inserted") and Li-extracted (also referred to as "Li de-inserted") graphene electrodes were investigated by ex-situ, SAED, TEM, XPS, and Raman spectroscopy.

Figure 4A:
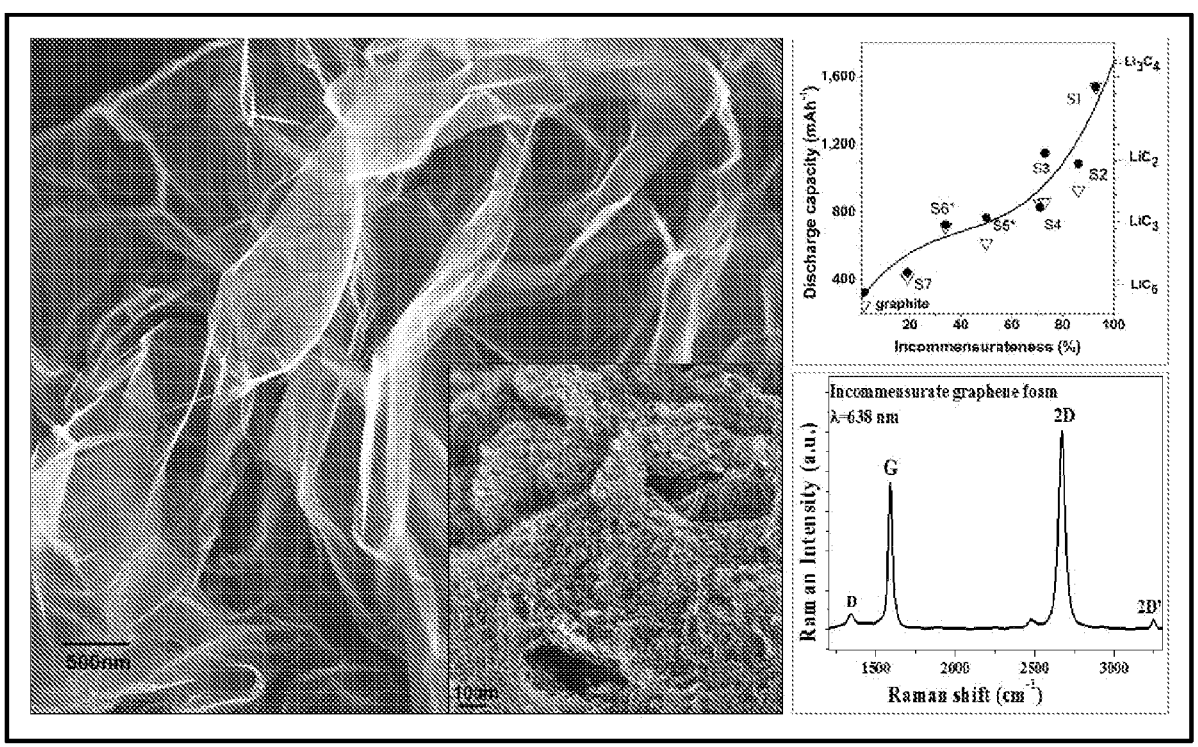
FIG. 4A is a high-resolution SEM image of pristine incommensurate multilayer graphene (IMLG) foam sheets with insets showing large scale SEM image of graphene foam and a graph showing the discharge capacity dependence of seven samples on incommensurateness percentage as estimated by Raman spectroscopy and the Raman spectrum of the incommensurate graphene foam taken from 960 spots excited by a $\lambda$ = 638 nm laser.
Figure 4B:
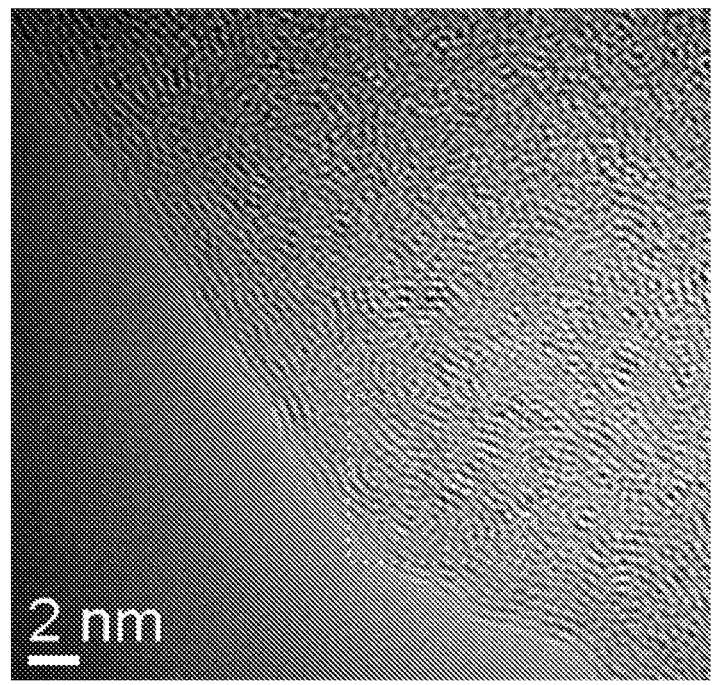
FIG. 4B is a bright field High Resolution Transmission Electron Microscope (HRTEM) image taken at 200 kV of a single curved graphene sheet.
Figure 4C:
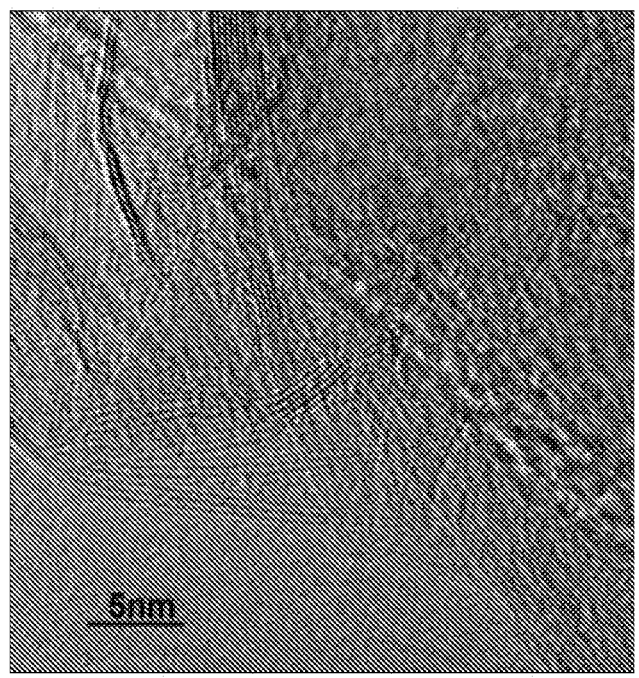
FIG. 4C is a bright field HRTEM image taken at 200 kV of several curved graphene sheets.
Figure 4D:
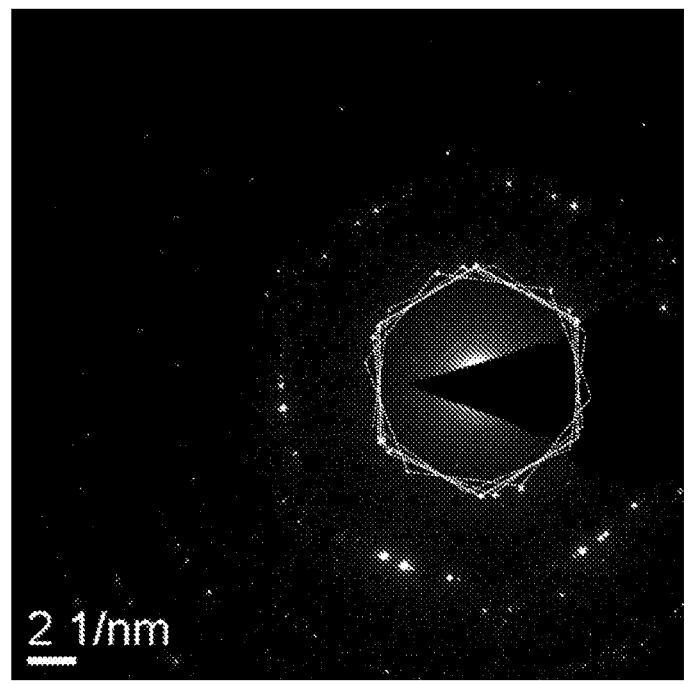
FIG. 4D is a Selected Area Electron Diffraction (SAED) pattern showing five hexagonal patterns of graphene layers rotated relative to each other by 5 - 30°.
Figure 4E:
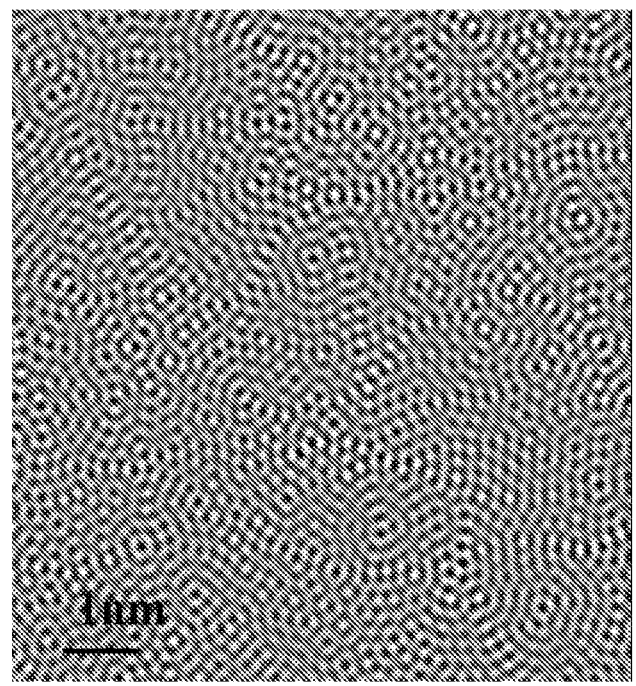
FIG. 4E is a Fast Fourier Transfer (FFT) analysis of a masked area from FIG. 4B.
Figure 4F:
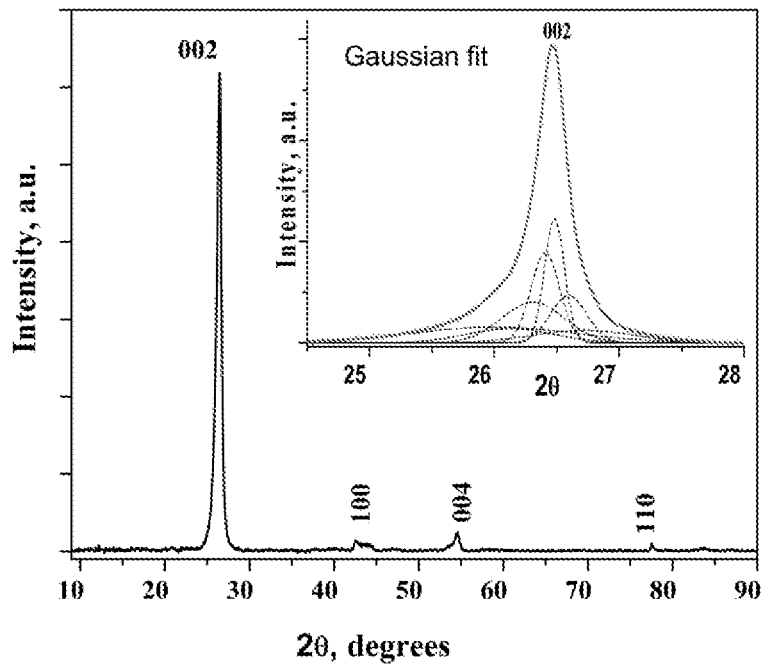
FIG. 4F is an X-ray Diffraction (XRD) pattern of the incommensurate graphene foam of FIG. 3A with an inset showing XRD 002 peak analyzed by Gaussian fit.

FIGS. 4A - 4G show the incommensurate multilayer graphene foam produced using the present inventive method. Specifically, FIG. 4A is a high-resolution SEM image of the graphene foam which shows, along with its inset images, few micron-size graphene sheets very well connected to each other without significant damage areas or agglomeration and separated from each other by micropores. FIG. 4B is an HRTEM image showing high quality curved single sheet with curved edges. As shown in FIG. 4C, the pieces are enriched and have from 2 to about 30 layers, and in a few areas much thicker graphite pieces with over 30 layers are found. The SAED pattern of curved sheets, shown in FIG. 4D reveals several hexagonal patterns rotated to each other at various angles of 5° - 30°. As shown in FIG. 4E, after FFT analysis of the HRTEM image Moire patterns are observable as a result of twisted multilayer graphene planes. The stacking multilayers, such as graphite pieces, also are found, but in just a few areas. Topological defects such as tetragons, pentagons were observable on HRTEM images after FFT, but are not noticeable in nearby distances. Thus, it is believed that the grains or crystallites on the graphene planes mostly originate by topological defects in the basal plane, which results in the curved nature of graphene sheets and incommensurate stacking of adjacent layers to each other. XRD analysis of bulk material shows a high intensity broadened (002) peak at 26.35° (d=3.38 Å) and very low intensity peaks at 42.63°, 54.73°, 77.57°, corresponding to (100), (004), (110) planes respectively as shown in FIG. 4F, confirming the high crystallinity of the graphene structure and disorientation of graphene layers in the c axis (the peaks related to ordering in c axis such as (101), (112), (113) etc. are missing on XRD pattern).

Figure 4G:
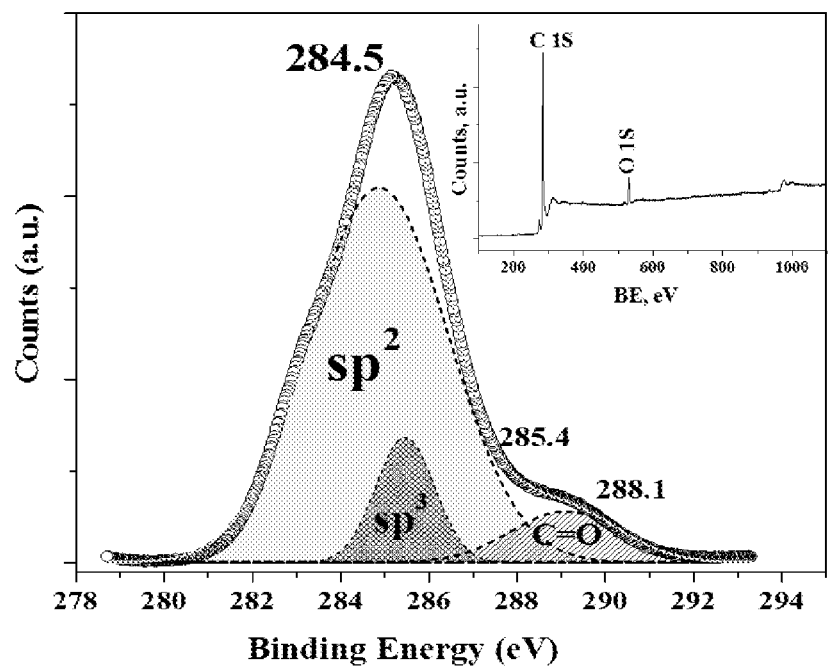
FIG. 4G is an X-ray photoelectron spectroscopy (XPS) analysis of the pristine graphene foam irradiated by a Mg K$\alpha$ 1253.6 eV source with an inset showing a survey of the XPS spectra.

The Gaussian fit into the (002) peak reveals more than two components with various interlayer d distances varied (d=3.34-3.45 Å), which is very similar to d of Bernal stacking (named also AB stacking) graphite d values. The broader the (002) peak, the fewer the number of layers. The peaks (002) and (004) are responsible of the parallel stacking of the layers in the c axis and (100), whereas (110) peaks originate due to in-plane crystalline order of graphene. As shown in FIG. 4G photoelectron X-ray Spectroscopy (XPS) analysis of the graphene structure indicates mainly $sp^2$ C-C carbon corresponding to the peak at 284.8 eV, small $sp^3$ peak at 285.4 eV and a low intensity peak at 288.1 eV of C-O bonded carbon. In fact, the growth process creates high crystalline parallel stacked $sp^2$ hexagonal carbon planes randomly rotated relative to each other with fixed distances without any ordering the in c axis.

Figure 5A:
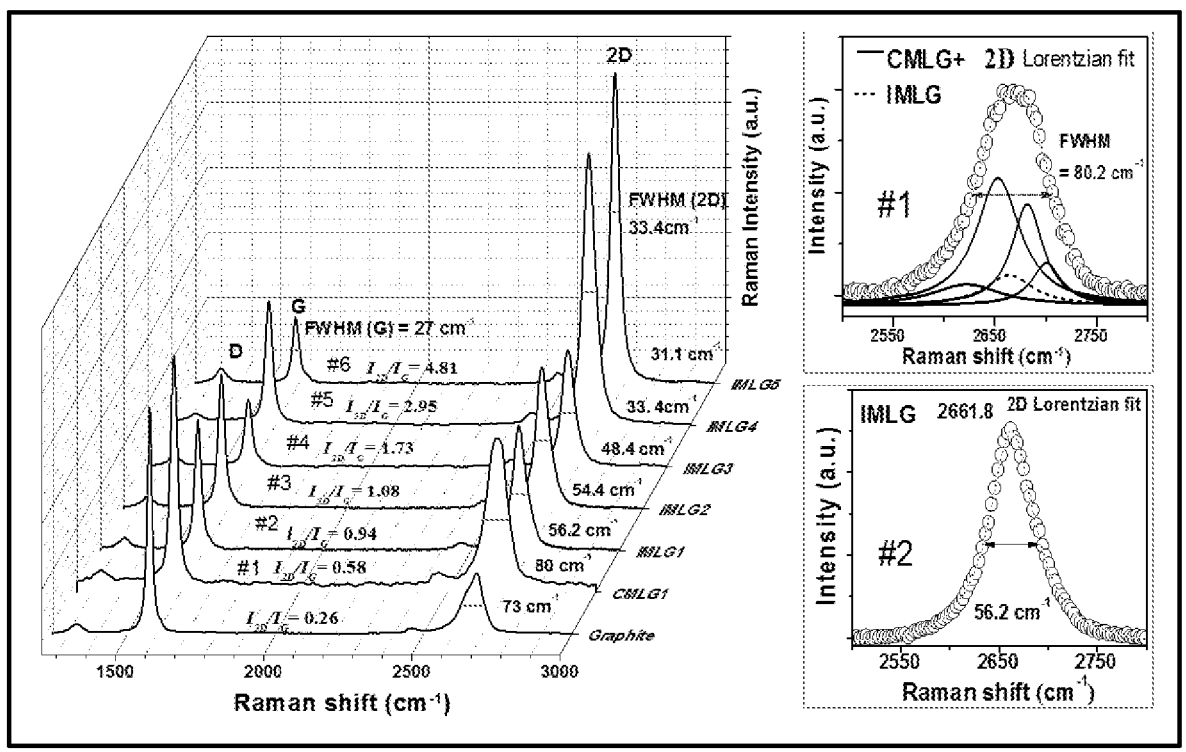
FIG. 5A is Raman spectrum at 638 nm laser wavelength of an incommensurate or IMLG graphene sheet and a commensurate or CMLG graphene sheet with possible changes of interplanar rotation angles wherein the spectra at right shows the difference of IMLG and CMLG by Lorentzian fit of 2D Raman peak.
Figure 5B:
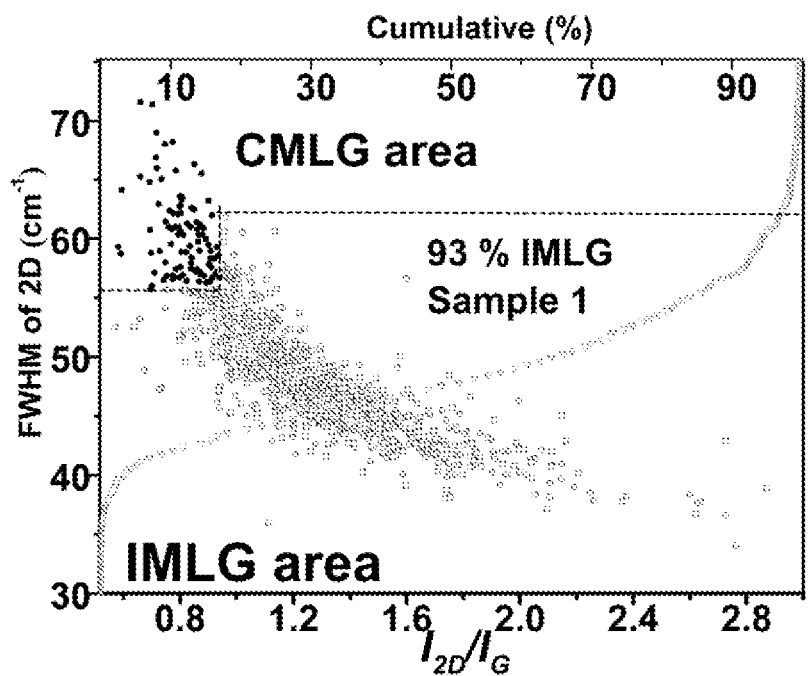
FIG. 5B represents an estimation of incommensurateness by scatter-gram of full width of half maximum (FWHM) of Raman 2D band and $I_{2D}/I_G$ for first sample from a graphene sheet made according to the present inventive method analyzed for 960 spots by 5×5 (X;Y) µm step of Raman mapping. IMLG (open squares), CMLG (solid dots) based on spectra shown in FIG. 5A.

FIGS. 5A and 5B show structural and binding analysis using Raman spectroscopy on a molecular scale. The Raman spectrum of multilayer graphene 2D band single- or multi- Lorentzian fit discriminates between commensurate and incommensurate stacking. The values of the 2D bandwidth, which are presented as full width of half maxima or FWHM, and $I_{2D}/I_G$ of many typical Raman spectra from various regions of samples were carefully analyzed to classify incommensurate and commensurate stacking ratio in bulk fraction. Low intensity D band and high Intensity 2D band of Raman spectra confirms large crystallites in graphene plane performing like a single layer graphene.

These incommensurately-stacked, randomly rotated planes are indicative of incommensurate multilayer graphene because commensurate stacked graphite performs only single hexagonal pattern on SAED. The interaction forces between incommensurate graphene planes are considered much weaker compared to commensurate stacking due to the misorientation of the layers. Graphene-graphene interaction forces become less by increasing of rotation angle and that affects to Raman spectra behavior too. Therefore, it is believed that the mechanical, electrical and optical properties of the material are different compared to commensurate multilayer graphene.

Large crystallites in the planes is one advantage of this material considering that a high density charge transfer would occur during current collection. In addition to expecting a high density charge transfer, it is believed that easy intercalation of small size ions such as lithium between two graphene layers can occur due to much weaker interaction forces as a result of the incommensurate stacking nature of parallel sheets.

The graphene network shown in FIGS. 4A - 4G and FIGS. 5A and 5B was used to evaluate the graphene network potential in lithium ion batteries. LiBs half cells were assembled based on incommensurate multilayer graphene foam and Li foil as a counter electrode separated by two pieces of a glass fiber filter using a coin-type cell. All cell construction was done in an argon-filled glove box. A 1 mol solution of $LiPF_6$ was dissolved in a 1:2 by volume mixture of ethylene carbonate, and dimethyl carbonate was used as the electrolyte. The galvanostatic charge-discharge measurements were carried out using the Arbin instrument. Discharge and charge measurements were carried out at a voltage range of 3.0-0.005 V with different current densities of 100, 200, 500 mA/g, 1.0, 2.0, and 5.0 A/g. The cyclic voltammetry (CV) measurements were carried out at the voltage range of 3.0-0.005 V with scan speed of 1 mV/s using an eDAQe-corder potentiostat.

Figure 6A:
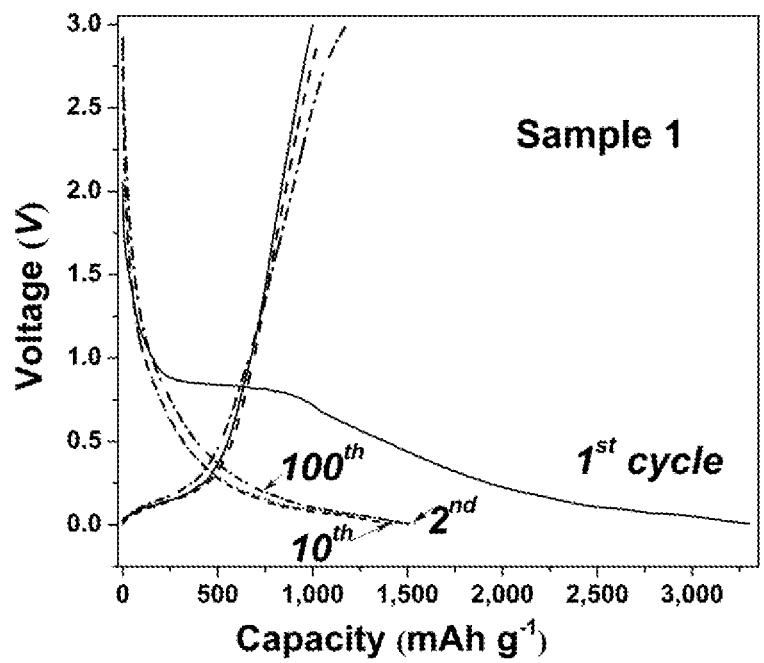
FIG. 6A shows the charge/discharge voltage-capacity curves of the IMLGF-based coin cells from a highly enriched incommensurate few layer graphene anode tested at 100 mA g$^{-1}$ current density plotted after the 1$^{st}$ cycle (solid), 2$^{nd}$ cycle (dotted), 10$^{th}$ cycle (dash) and 100$^{th}$ (dash dot) for Sample 1.
Figure 6B:
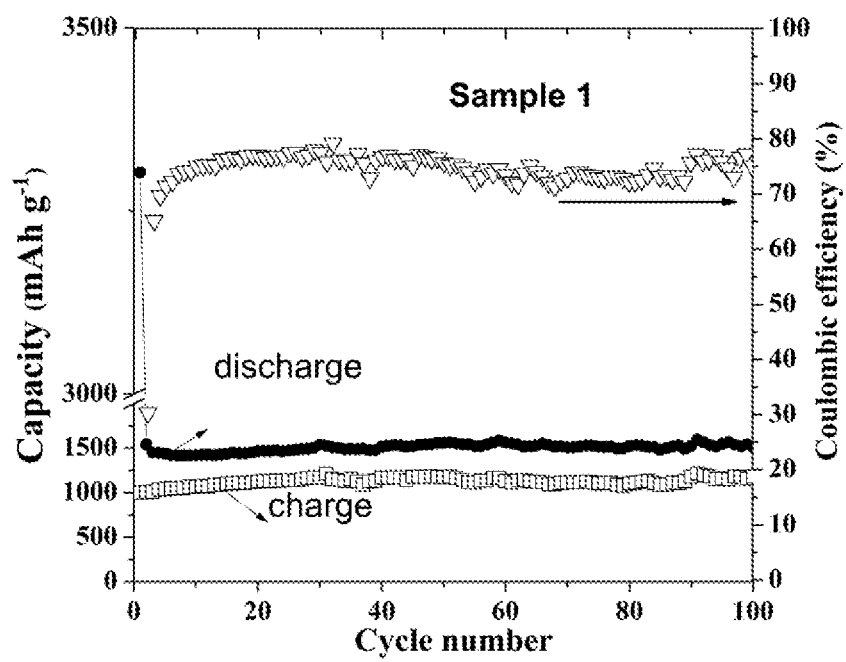
FIG. 6B is a set of specific capacity cycling profiles at 100 mA g$^{-1}$ of cells for the sample of FIG. 6A wherein the open squares record charge capacity, the solid circles record discharge capacity, and the open triangles record Coulomb efficiency values for each cycle.
Figure 6C:
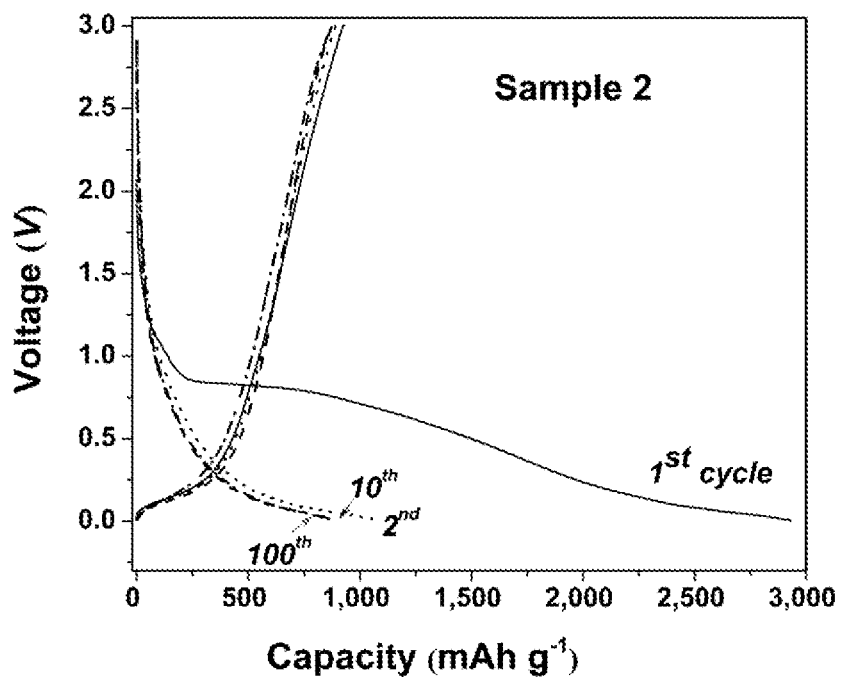
FIG. 6C shows the charge/discharge voltage-capacity curves of the IMLGF-based coin cells from a highly enriched incommensurate few layer graphene anode tested at 100 mA g$^{-1}$ current density plotted after the 1$^{st}$ cycle (solid), 2$^{nd}$ cycle (dotted), 10$^{th}$ cycle (dash) and 100$^{th}$ (dash dot) for Sample 2.
Figure 6D:
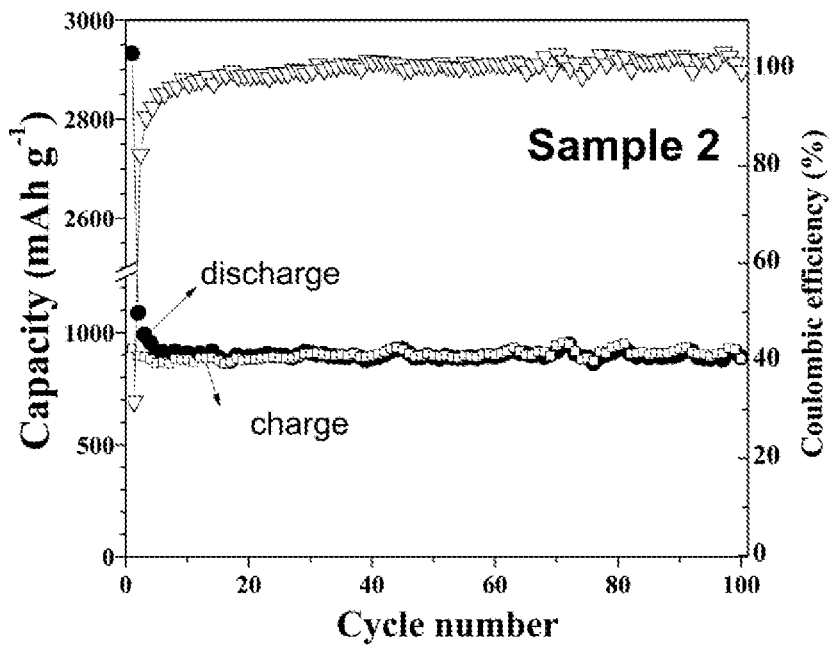
FIG. 6D is a set of specific capacity cycling profiles at 100 mA g$^{-1}$ of cells for the sample of FIG. 6C wherein the open squares record charge capacity, the solid circles record discharge capacity, and the open triangles record Coulomb efficiency values for each cycle.
Figure 6E:
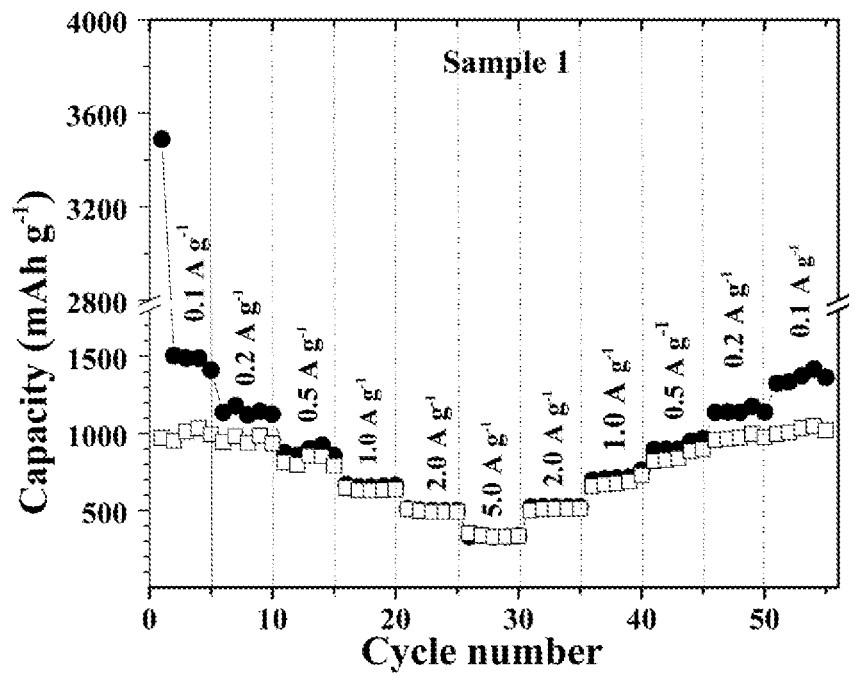
FIG. 6E shows the capacity C-rate testing of coin cells from the sample of FIG. 6A tested at different current densities wherein the open squares represent charge capacity and solid circles represent discharge capacity.
Figure 6F:
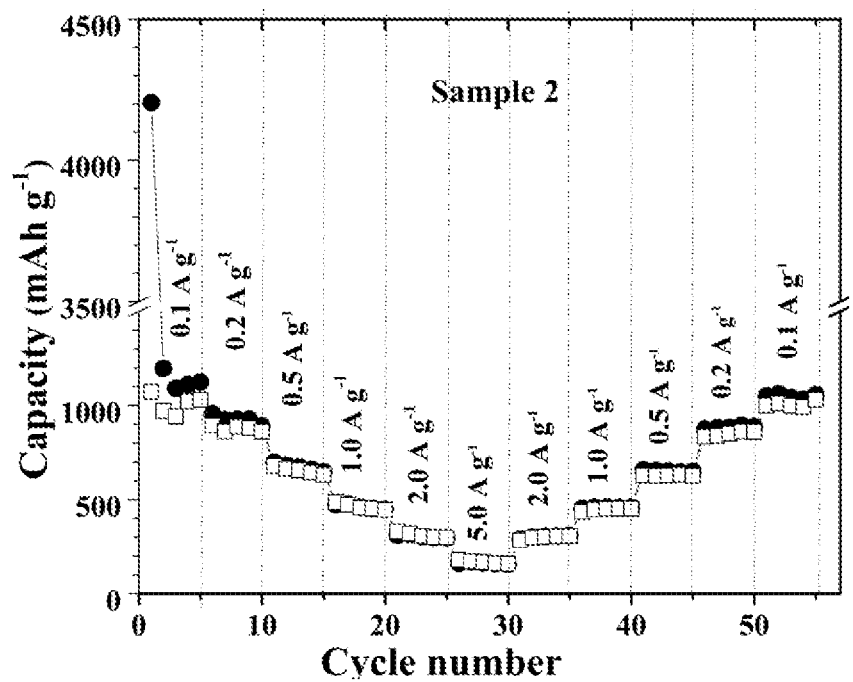
FIG. 6F shows the capacity C-rate testing of coin cells from the sample of FIG. 6C tested at different current densities wherein the open squares represent charge capacity and solid circles represent discharge capacity.
Figure 6G:
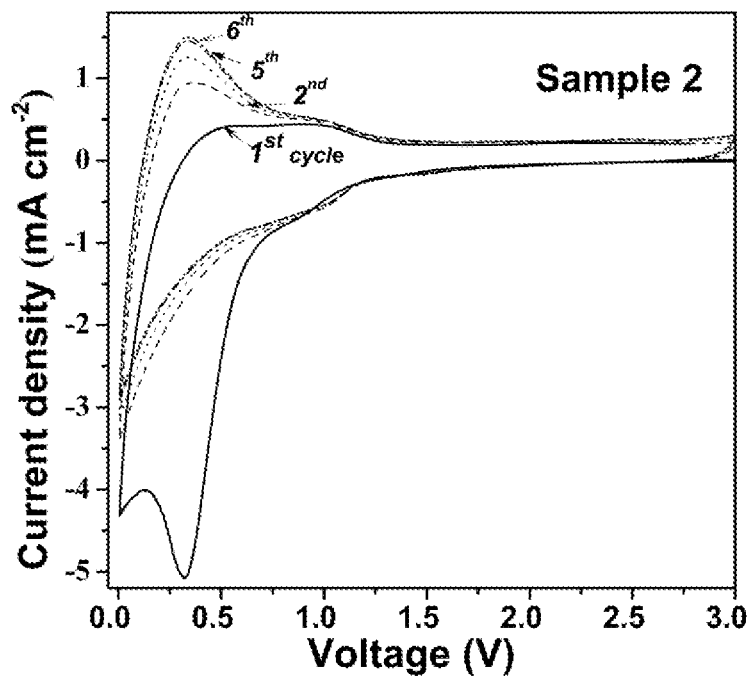
FIG. 6G shows the CV curves for the first six cycles of cells at 3.0-0.005 V with a scan speed of 1 mV/s prepared of a piece of the sample of FIG. 6A wherein the first cycle is represented by the solid line, the second cycle is represented by the dashed line, the third cycle is represented by the dotted line, the fifth cycle is represented by the dash dotted line and the sixth cycle is represented by the dash dot dot line.
Figure 6H:
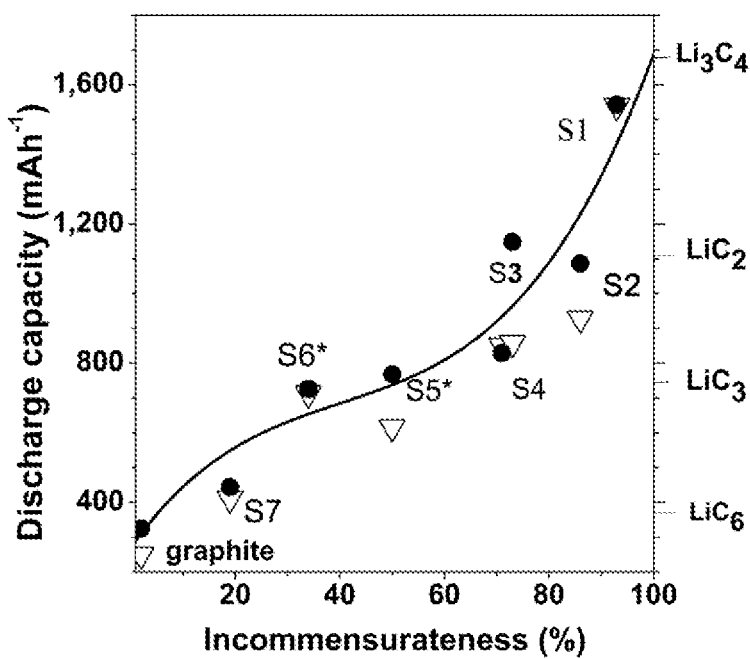
FIG. 6H shows the discharge capacity dependence of seven samples on incommensurateness percentage as estimated by Raman spectroscopy.

FIGS. 6A - 6G show the performance capabilities of graphene sheets made according to the present inventive methods when used in lithium ion batteries. FIG. 6A shows the charge/discharge voltage-capacity curves of the IMLG-based coin cells from a first sample (Sample 1) which is a highly enriched up 93% of incommensurate graphene anode made according to the present inventive method which was tested at 100 mAh g$^{-1}$ current density plotted after the 1$^{st}$ cycle, 2$^{nd}$ cycle, 10$^{th}$ cycle and 100$^{th}$ cycles. The first discharge capacity usually gains up to about 3000 to 3700 mAh g$^{-1}$, corresponding to the reaction of electrolyte at the surface of carbon with transferred lithium atoms to form a passivating film named as an SEI layer. This passivating film is a solid electrolyte and once formed, prevents further electrolyte reaction. Thus, the first discharge curve is different from subsequent cycling curves. The second discharge capacity occurs at about 1050-1600 mAh g$^{-1}$ depending on the various samples of IMLG foam, and shows a slightly decreasing discharge capacity in the first few cycles. Nevertheless, the reproducible capacity is stabilized after a few cycles, usually in the 4$^{th}$ or 5$^{th}$ cycle, and performs slightly variation in capacity values for the different IMLG foam pieces. As shown in FIG. 6B, the performance of charge/discharge cycling remains more or less reversible in the 100$^{th}$ cycle of the cells at 100 mAh g$^{-1}$ current density though with relatively low columbic efficiency of 75% for a Sample 1. FIGS. 6C and 6D show the charge/discharge voltage-capacity curves and the specific capacity cycling profiles, respectively, of the IMLG-based coin cells from a second sample (Sample 2) which is enriched up to 86% of incommensurate graphene anode tested at 100 mAh g$^{-1}$ current density. As shown, Sample 1 demonstrates a much higher reversible discharge capacity of >1500 mAh g$^{-1}$ in the 2$^{nd}$ and consequent cycles demonstrating over 95% retained capacity during the cycling but relatively lower coulombic efficiency around 70-75%. The reversibility of this high discharge capacity remains very stable even in long term cycling process at 100 mAh g$^{-1}$. The rate capability of the cells and Li/Li$^+$ potential of Sample 2 were characterized by cyclic voltammetry shown in FIG. 6D. The shape of curves matches the voltage plateaus of profiles in FIG. 6C. The anodic peak at +0.34 V is fully developed and stabilized within first 5 cycles indicating maximum lithium insertion. FIGS. 6E and 6F show the capacity rate testing of coin cells from the first sample and from the second sample from the graphene sheet, respectively, tested at different current densities. C-rate testing of coin cells based on IMLG samples demonstrates great reproducibility with different current densities as shown in FIG. 6G. FIG. 6H shows the discharge capacity dependence of seven samples including Sample 1, designated S1, and Sample 2, designated S2 on incommensurateness percentage as estimated by Raman spectroscopy.

Figure 7A:
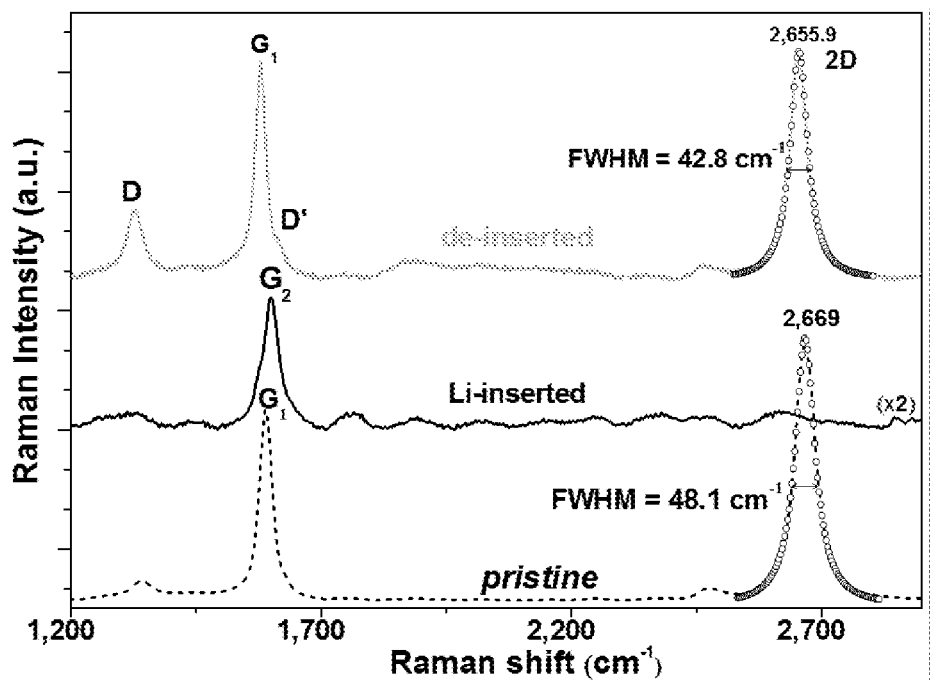
FIG. 7A is an ex-situ Raman analysis of graphene electrode assembled from Sample 1.
Figure 7B:
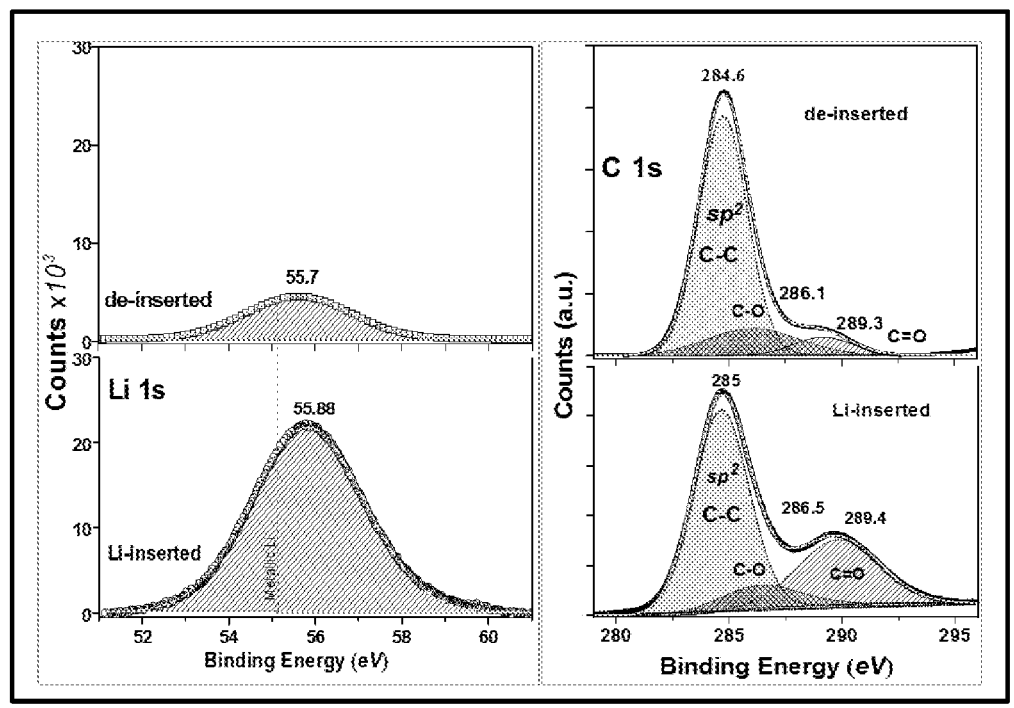
FIG. 7B is an ex-situ XPS analysis of graphene electrodes assembled of Sample 1.
Figure 8A:
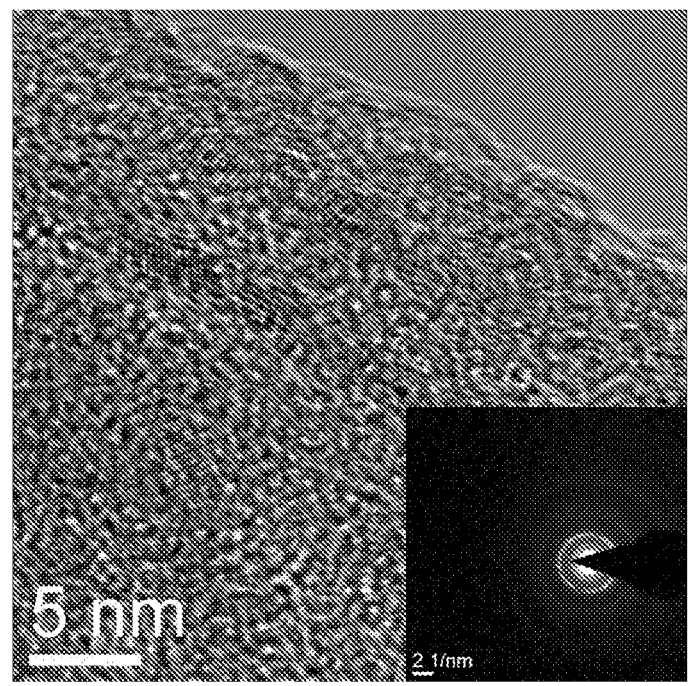
FIG. 8A is a bright field HRTEM image taken of a first set of Li-inserted graphene sheets of the sample of FIG. 5C after the fifth cycle with an inset showing an SAED pattern of the same area at lower magnification.
Figure 8B:
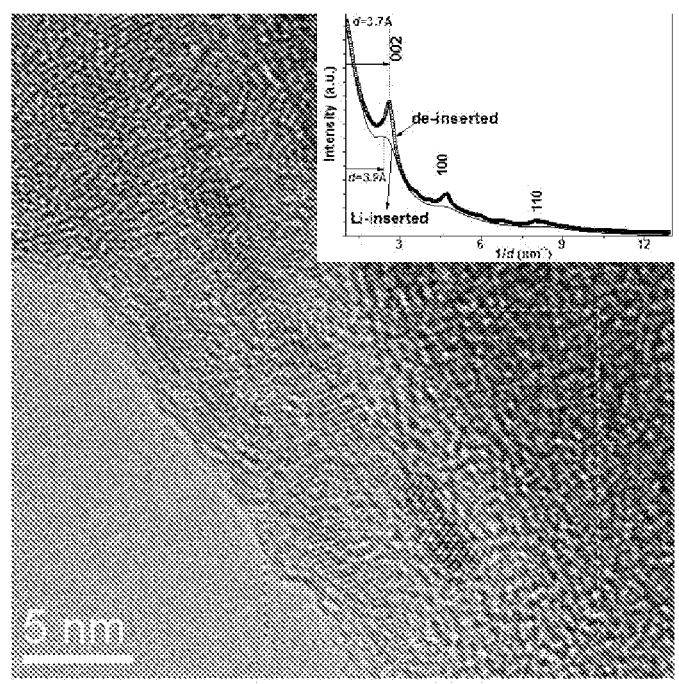
FIG. 8B is a bright field HRTEM image taken of a second set of Li-inserted graphene sheets after the fifth cycle with an inset showing the intensity-distance (nm$^{-1}$) graph between aligned spots.
Figure 8C:
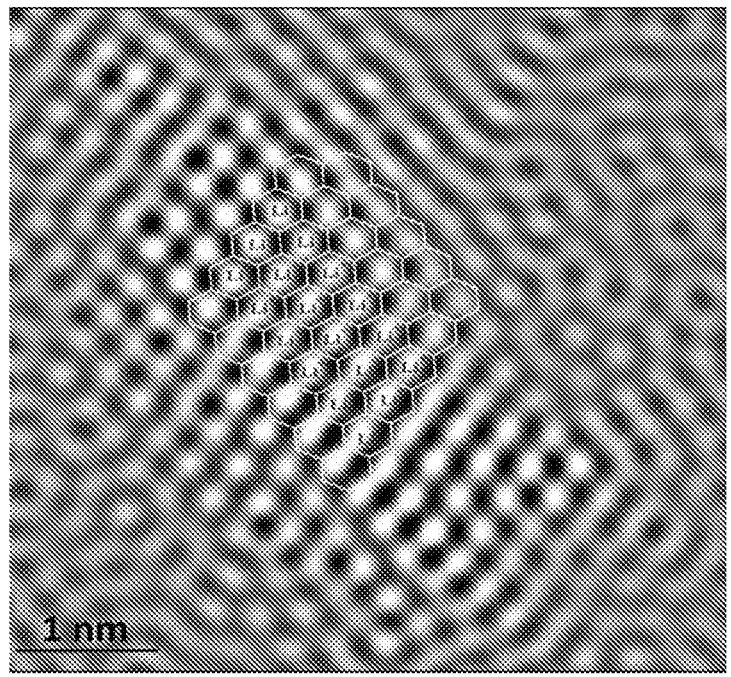
FIG. 8C is an FFT analysis of a masked area from FIG. 6B graphene network with attached lithium ions schematically drawn on aligned bright spots.
Figure 8D:
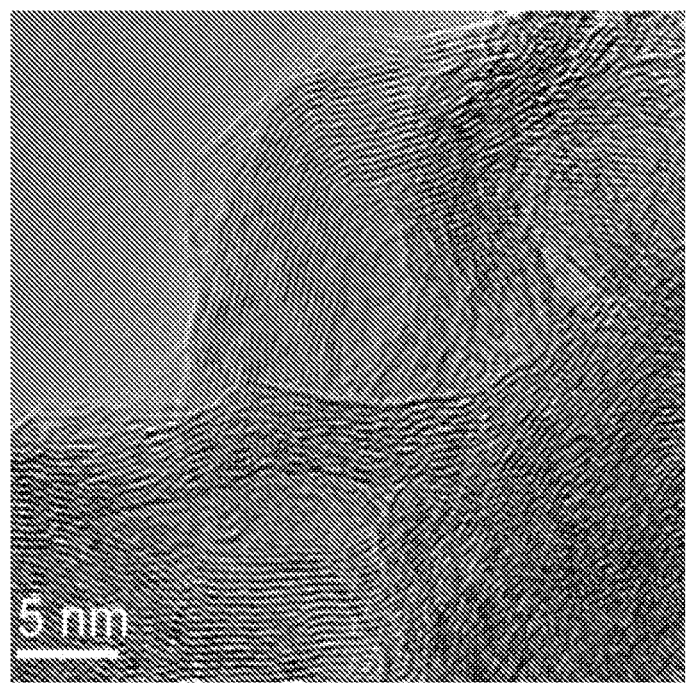
FIG. 8D is a bright field HRTEM image taken of a first set of lithium de-inserted graphene sheets after the 100$^{th}$ cycle of battery tests.
Figure 8E:
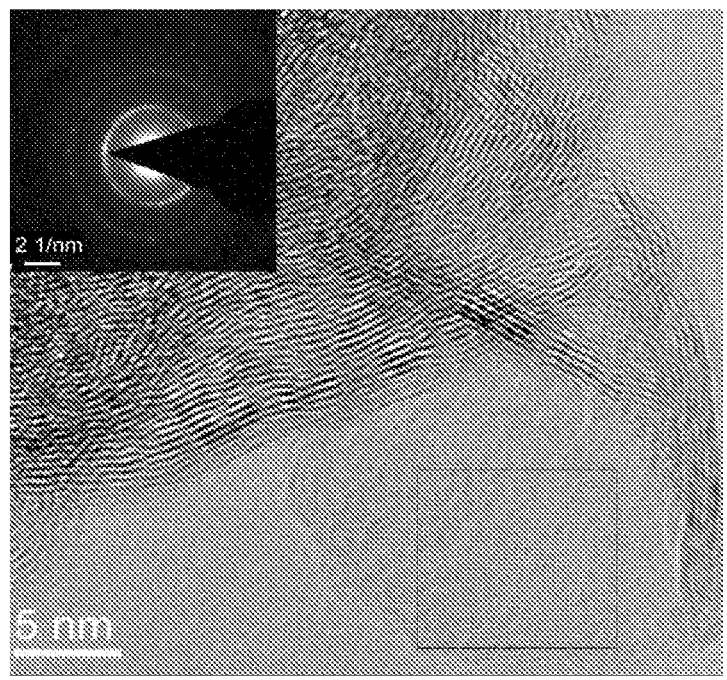
FIG. 8E is a bright field HRTEM image taken of a second set of lithium de-inserted graphene sheets after the fifth cycle with an inset showing an SAED pattern of the same area at lower magnification.
Figure 8F:
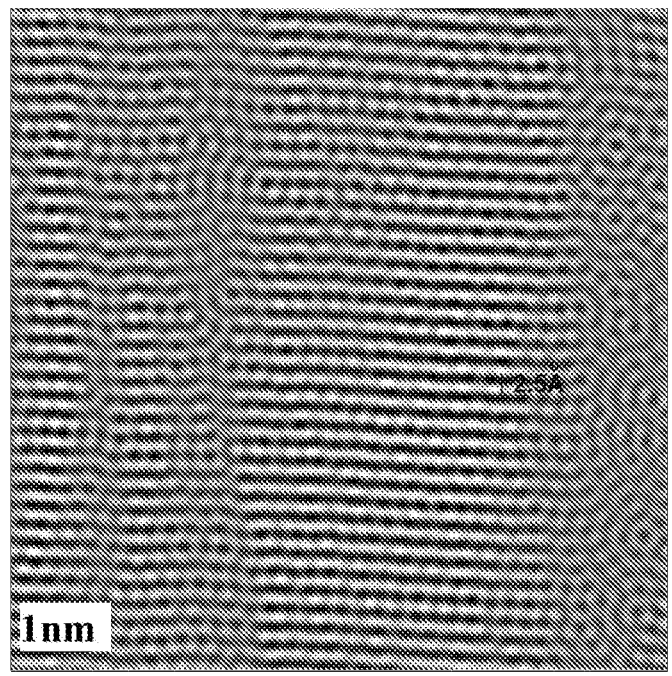
FIG. 8F is an FFT analysis of a masked area from FIG. 8E graphene network.
Figure 8G:
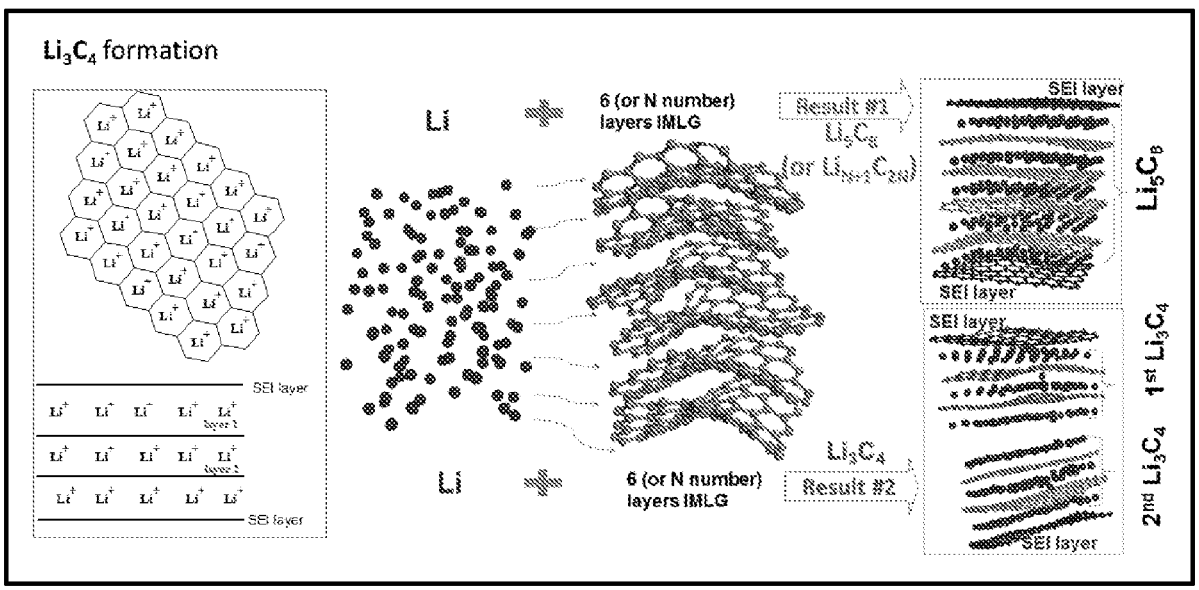
FIG. 8G is a schematic illustration of Li intercalation mechanism within four-layer and bilayer graphene configuration.

Structural and electronic changes in the graphene are indicated by Raman analysis of electrodes as shown in FIG. 7A. The significant shift and splitting of G band was observed: $G_1$- related to interior carbon layer with no lithium intercalated and $G_2$- related to bonded carbon layer with lithium. The height ratio of $G_1$ to $G_2$ peaks was 0.08 averaged for 80 spectra of Sample 1 which increases to 14.7 after de-insertion which confirms that lithium atoms are easy reversible bonded/de-bonded from sp$^2$ carbon. The 2D and D bands nearly disappeared due to large amount of lithium insertion. De-inserted samples after 100 cycles performed great homogeneity in ratio of G and 2D peaks and no significant change of D band for both low and high capacity demonstrated samples demonstrating stability of this electrodes in the ling-term cycling. The XPS spectrum of C 1 s shows multiple splitting in Gaussian fit by forming C—C (sp$^2$), O—C—O and C=O bonds as shown in FIG. 7B. The shift of sp$^2$ peak by 0.5 eV (compared to pristine) confirms the charge transfer to carbon. SAED measurements as shown inset of FIG. 8B indicates that the stacking geometry of incommensurate graphene sheets certainly are changed after the insertion/de-insertion of lithium. The revealed d-spacing peaks at $d_{Li\text{-}inserted}$ = 3.9-4.06 Å and $d_{de\text{-}inserted}$ = 3.65-3.8 Å (FIG. 4b) indicate to AA stacking. In fact, once the sheets were adjusted to AA stacking during lithium intercalation, they stayed in that position after de-insertion governing further reversible cycling of graphene material It is anticipated that the graphene sheets made according to the present method will accommodate lithium ions. As shown in FIGS. 8A and 8B, HRTEM images of graphene sheets acquired from shortly exposed highly lithiated electrodes have found several spots of well aligned patterns. FFT analysis revealed that white spots aligned along carbon atoms had larger sizes, as shown in FIG. 8C, and Moire patterns were observable from background. Through the arrangement of these atoms, it was possible to assign the arrangement of lithium atoms in a manner similar to the alignment of each center of a hexagonal ring in graphene plane, as depicted in the schematic of FIG. 8G, once the two graphene sheets are freely paired. As shown in FIGS. 8D and 8E, HRTEM images of de-inserted graphene sheets shows much different images than the Li-inserted graphene sheets. Linear patterns on the de-inserted graphene sheets are observed to be governed by shape of grain centers and curved edges. FFT analyses of most transparent and flat areas (avoiding crossing patterns) on the HRTEM image shown in FIG. 8F, masked area, reveals that the distance between patterned lines is 2.51 Å, which is likely caused by AA stacking orientation.

The inventor has pending patent applications presenting information about the structural analysis of the graphene networks formed by the present inventive method. These publications and applications include U.S. App. 62/258,779 (currently pending) which is incorporated herein in its entirety by reference.

Unless defined otherwise, all technical and scientific terms used herein have the same meaning as commonly understood by one of ordinary skill in the art to which the presently disclosed subject matter pertains. All patents, patent applications, published applications and publications, databases, websites and other published materials referred to throughout the entire disclosure herein, unless noted otherwise, are incorporated by reference in their entirety. Representative methods, devices, and materials are described herein, but are not intended to be limiting unless so noted.

The terms "a", "an", and "the" refer to "one or more" when used in the subject specification, including the claims. Thus, for example, reference to "a graphene network" includes a plurality of such networks, and so forth. The term "ambient temperature" as used herein refers to an environmental temperature of from about 0° F. to about 120° F., inclusive.

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments ± 20%, in some embodiments ± 10%, in some embodiments ± 5%, in some embodiments ± 1%, in some embodiments ± 0.5%, and in some embodiments to ± 0.1%, from the specified amount, as such variations are appropriate in the disclosed application.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

All compositional percentages used herein are presented on a "by weight" basis, unless designated otherwise.

It is understood that, in light of a reading of the foregoing description, those with ordinary skill in the art will be able to make changes and modifications to the present invention without departing from the spirit or scope of the invention, as defined herein. For example, those skilled in the art may substitute materials supplied by different manufacturers than specified herein without altering the scope of the present invention.

What is claimed is:

1. A method for preparing a multilayer graphene network comprising:
   (a) providing a reaction chamber;
   (b) adding nickel metal particles having non-uniform particle sizes of from about 1 μm to about 200 μm to the reaction chamber, wherein the nickel particles are selected so as to produce a curved catalyst template;
   (c) pressurizing the reaction chamber to a pressure of from about 40 mTorr to about 150 mTorr;
   (d) heating the pressurized reaction chamber according to a predetermined program to form the curved metal catalyst template from the metal particles;
   (e) feeding a hydrocarbon source into the reaction chamber;
   (f) allowing the hydrocarbon source to deposit on the metal catalyst template to form a graphene-metal template, wherein the graphene forms as a plurality of graphene sheets arranged in a three-dimensional (3D) network having an incommensurate stacking structure;
   (g) allowing the reaction chamber and the graphene-metal template to cool to a predetermined temperature while maintaining a pressure of from about 40 mTorr to about 150 mTorr;
   (h) removing the metal from the graphene-metal template to obtain a graphene network with incommensurate stacking; and
   (i) collecting the graphene network,
   wherein a carrier gas selected from Ar, He, $H_2$, $N_2$, and mixtures thereof flows through the reaction chamber while the metal template is formed or while the graphene-metal template is formed or while the metal template and the graphene-metal template are formed.

2. The method of claim 1 wherein the metal particles are non-uniform nickel particles having a particle size of from about 1 μm to about 40 μm.

3. The method of claim 1 wherein the step of forming the metal catalyst template is performed at a temperature of from about 1000° C. to about 1050° C.

4. The method of claim 1 wherein the hydrocarbon source is applied at a rate of from about 1 sccm to about 20 sccm.

5. The method of claim 4 wherein the hydrocarbon source is $CH_4$.

6. The method of claim 1 wherein the hydrocarbon source is applied at a temperature of from about 1025° C. to about 1050° C.

7. The method of claim 1 wherein the metal is removed from the graphene-metal template by etching.

8. A method for preparing a multilayer graphene network comprising:
   (a) providing a reaction chamber;
   (b) adding metal particles having non-uniform particle sizes of from about 1 μm to about 200 μm to the reaction chamber;
   (c) allowing a carrier gas to flow through the reaction chamber at a rate of from about 10 sccm to about 1000 sccm and make contact with the metal particles;
   (d) pressurizing the reaction chamber to a pressure of from about 45 mTorr to about 55 mTorr while the carrier gas is flowing through the chamber;
   (e) heating the pressurized reaction chamber a temperature of from about 1025° C. to about 1050° C. to form a curved metal catalyst template from the metal particles;
   (f) feeding a hydrocarbon source into the pressurized reaction chamber while continuing the carrier gas flow;
   (g) allowing the hydrocarbon source to deposit on the metal catalyst template to form a graphene-metal template, wherein the graphene forms as a plurality of graphene sheets arranged in a three-dimensional (3D) network having an incommensurate stacking structure;
   (h) allowing the reaction chamber and the graphene-metal template to cool to a final temperature of about 25° C. at a cooling rate of 100° C./min while continuing the carrier gas flow and while holding the reaction chamber pressure at 45 mTorr to 55 mTorr;
   (i) removing the metal from the graphene-metal template to obtain a graphene network with incommensurate stacking;
   (j) washing the graphene network;
   (k) drying the graphene network by covering the graphene network with high purity liquid $CO_2$ at a pressure of 800 psi (±5%) and heating the reaction chamber to about 40° C. while increasing the pressure to about 1200 psi, and then allowing the chamber to cool to about 25° C. and allowing the pressure to drop to about 400 psi; and (l) collecting the graphene network.

9. The method of claim 8 wherein the metal particles are nickel particles have a particle size of from about 1 μm to about 40 μm.

10. The method of claim 9 wherein the reaction chamber with the nickel particles is heated to 600° C. at a 50° C./min heating rate, and then the chamber is heated to 1000° C. at a 70° C./min heating rate and held at 1000° C. for 10 minutes, and then the chamber is heated at a rate of 70° C./min until the chamber reaches a temperature of from about 1025° C. to about 1050° C.

11. The method of claim 8 wherein the hydrocarbon source is $CH_4$.

12. The method of claim 8 wherein the carrier gas is a mixture of $Ar/H_2$ at a ratio of 3:2 and wherein the carrier gas has a flow rate of from about 20 sccm to about 150 sccm.

13. The method of claim 8 wherein the etching is accomplished by using hydrochloric acid or nitric acid or ferric chloride or a combination thereof.

14. The method of claim 8 wherein the graphene network is washed with de-ionized water and then with pure ethylene alcohol and then the graphene network is placed in a chamber and covered with ethylene alcohol and cooled to slightly below 20° C.

* * * * *